United States Patent [19]

Hamer et al.

[11] Patent Number: 5,019,219

[45] Date of Patent: May 28, 1991

[54] VACUUM DISTILLATION PROCESS

[75] Inventors: Johannes A. Hamer; Pieter Van Der Heijden, both of The Hague, Netherlands

[73] Assignee: Shell Oil Company, Houston, Tex.

[21] Appl. No.: 477,407

[22] Filed: Feb. 9, 1990

[30] Foreign Application Priority Data

Feb. 10, 1989 [GB] United Kingdom ................ 8903013

[51] Int. Cl.[5] ................................ B01D 3/10

[52] U.S. Cl. ................................ 203/91; 202/205; 203/DIG. 9; 203/DIG. 25; 208/366

[58] Field of Search .......... 203/91, DIG. 9, DIG. 25; 202/205; 159/DIG. 23, DIG. 16, 47.1; 208/366

[56] References Cited

U.S. PATENT DOCUMENTS

| | | | |
|---|---|---|---|
| 2,664,391 | 12/1953 | Coulter | 202/153 |
| 3,334,027 | 8/1967 | Goeldner | 203/40 |
| 3,480,515 | 11/1969 | Goeldner | 203/90 |
| 3,749,647 | 7/1973 | Micklewright | 202/153 |
| 4,166,773 | 9/1979 | Higley et al. | 203/DIG. 25 |
| 4,323,431 | 4/1982 | Takashi et al. | 203/DIG. 25 |
| 4,568,428 | 2/1980 | Rigg et al. | 203/91 |

*Primary Examiner*—Virginia Manoharan

[57] ABSTRACT

A feed which contains vapor and liquid is introduced into a distillation column operating at a subatmospheric pressure. Vapor is allowed to rise inside the distillation column and liquid is allowed to drop to the bottom part of the distillation column. From said bottom part a liquid is passed through a transfer conduit to an external collecting vessel from which a liquid stream is withdrawn. The liquid stream is cooled and part thereof is introduced into the transfer conduit.

1 Claim, 1 Drawing Sheet

VACUUM DISTILLATION PROCESS

FIELD OF INVENTION

The present invention relates to a vacuum distillation process for distilling a feed containing hydrocarbons, which feed has a temperature in the range of from 380 to 425° C., at a subatmospheric pressure in the range of from 650 to 5,200 Pa. The feed is sometimes referred to as long residue.

DETAILED DESCRIPTION OF INVENTION

Such a vacuum distillation process comprises introducing a feed which contains vapor and liquid into a distillation column operating at a subatmospheric pressure, allowing vapor to rise inside the distillation column, allowing liquid to drop to the bottom part of the distillation column, collecting liquid in a collecting vessel in the bottom part of the distillation column, removing liquid from the collecting vessel, cooling the liquid removed from the collecting vessel and introducing part of the cooled liquid into the liquid present in the collecting vessel.

The amount of liquid removed from the collecting vessel is such that a predetermined amount of liquid is maintained in the collecting vessel, wherein the liquid present in the collecting vessel acts as a seal. As a result gas cannot enter from the distillation column into the suction side of the pump which is used to remove liquid from the collecting vessel. In this way the pump is protected from damage, for example damage which is associated with cavitation.

Liquid present in the collecting vessel is cooled to prevent excessive cracking of the hydrocarbons so as to reduce the amount of gaseous hydrocarbons and consequently to further reduce cavitation in the pump which removes liquid from the collecting vessel.

It was found, however, that mixing in the collecting vessel is incomplete. As a result excessive cracking of the liquid in the collecting vessel is not prevented but continues.

It is an object of the present invention to provide a vacuum distillation process in which excessive cracking of liquid in the collecting vessel of the distillation column is reduced.

To this end the vacuum distillation process according to the present invention comprises introducing a feed which contains vapor and liquid into a distillation column operating at a subatmospheric pressure, allowing vapor to rise inside the distillation column, allowing liquid to drop to the bottom part of the distillation column, passing liquid through a transfer conduit from the bottom part to an external collecting vessel, removing liquid from the collecting vessel, cooling liquid removed from the collecting vessel, and introducing part of the cooled liquid into the liquid passing through the transfer conduit.

In this way a good heat-exchange is obtained even if the amount of cooled liquid introduced in the liquid passing through the transfer conduit is small compared to the amount of liquid present in the collecting vessel.

DETAILED DESCRIPTION OF THE DRAWING

Figure 1:
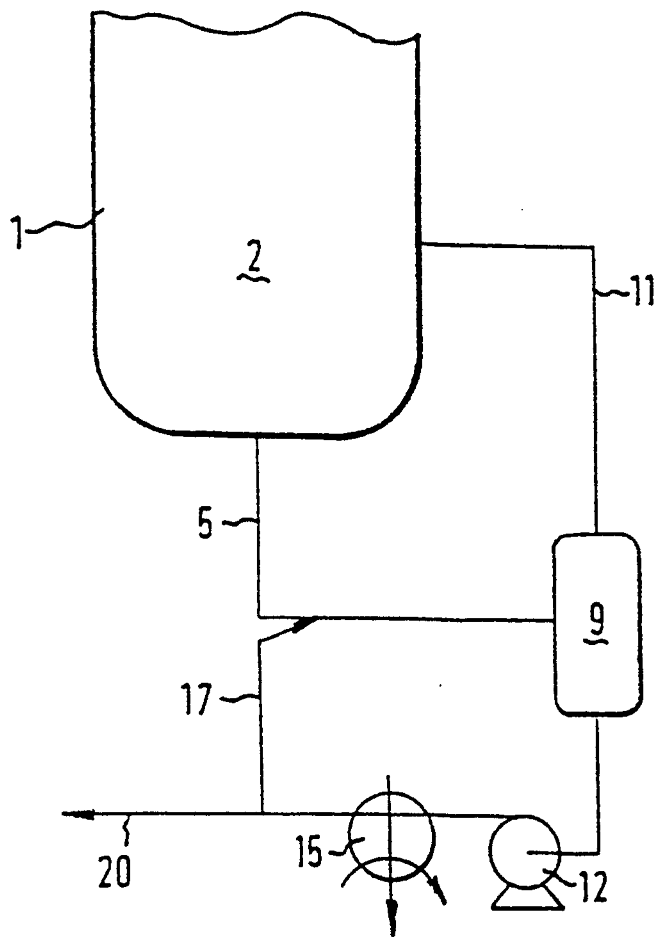
FIG. 1 schematically shows a longitudinal section of the lower part of a distillation column.

In FIG. 1 a distillation column 1 is shown with a bottom section 2. The column includes an inlet section into which a feed inlet debouches and a top section for removal of vaporous material.

During normal operation heated feed comprising vapor and liquid is passed through the feed inlet into the inlet section of the distillation column 1, while the pressure in the distillation column 1 is maintained at a subatmospheric level.

Vapor rises inside the distillation column 1 to the top section (not shown) from which the vapor is withdrawn by means of a vacuum pump such as a steam ejector (not shown).

Liquid drops downwards and is passed from the bottom section 2 through transfer conduit 5 to the collecting vessel 9 in which a predetermined amount of liquid is stored. To equalize the pressure in the gas space of the collecting vessel 9 and the pressure in the gas-filled lower part of the distillation column 1 gas is allowed to flow through connecting line 11.

To maintain the liquid level at a predetermined level, liquid is removed from the collecting vessel 9 by means of pump 12. The removed liquid is cooled in cooler 15.

The liquid which is supplied to the collecting vessel 9 is cooled in the following way. Between 30 and 70% by volume of the cooled liquid is supplied through conduit 17 to transfer conduit 5. The cooled liquid is mixed in the transfer conduit 5 with the liquid passing therethrough. The cooled liquid is introduced into transfer conduit 5 at a sharp angle with the direction of fluid flow through transfer conduit 5. The location at which the cooled liquid is introduced is close to the distillation column 1.

The balance of the cooled liquid, which is sometimes referred to as short residue, is withdrawn through conduit 20 for further use as for example fuel.

Through pump 12 cooled liquid flows so that cavitation is suppressed. This increases the life of the pump.

What we claim as our invention is:

1. A vacuum distillation process in a vacuum distillation column operating at subatmospheric pressure having a bottom section which consists essentially of introducing to said column through a column inlet a vapor-liquid admixture, separating said vapor-liquid and allowing said vapor to rise inside said distillation column and allowing said liquid to drop to said bottom section of said column, removing said liquid from said bottom part of said column to an external liquid collection vessel, removing liquid from said collection vessel, cooling said liquid removed from said collection vessel, and passing a portion of said cooled liquid into the liquid passing from the column to said collection vessel wherein the fraction of the cooled liquid which is introduced into the liquid passed from the column to the collecting vessel is equal to between 30 to 70% by volume of said cooled liquid.

* * * * *